US008897176B2

(12) United States Patent
Zhang et al.

(10) Patent No.: US 8,897,176 B2
(45) Date of Patent: Nov. 25, 2014

(54) METHOD, APPARATUS AND SYSTEM FOR PROCESSING PRIORITY SERVICES

(75) Inventors: Wanqiang Zhang, Beijing (CN); Xiaobo Wu, Shanghai (CN); Hai Liu, Shanghai (CN); Wenruo Zhu, Shanghai (CN); Tingting Deng, Beijing (CN); Weisheng Jin, Shanghai (CN); Yanglai Shuai, Shanghai (CN); Huadong Hu, Beijing (CN)

(73) Assignee: Huawei Technologies Co. Ltd., Shenzhen (CN)

( * ) Notice: Subject to any disclaimer, the term of this patent is extended or adjusted under 35 U.S.C. 154(b) by 67 days.

(21) Appl. No.: 13/572,623

(22) Filed: Aug. 11, 2012

(65) Prior Publication Data

US 2012/0307687 A1  Dec. 6, 2012

Related U.S. Application Data

(63) Continuation of application No. PCT/CN2011/070963, filed on Feb. 12, 2011.

(30) Foreign Application Priority Data

Feb. 12, 2010 (CN) .......................... 2010 1 0110642

(51) Int. Cl.
*H04W 72/10* (2009.01)
(52) U.S. Cl.
USPC .......................................................... 370/259
(58) Field of Classification Search
CPC .................................................. H04W 12/14
USPC .......................................................... 370/259
See application file for complete search history.

(56) References Cited

U.S. PATENT DOCUMENTS

| 2003/0235196 | A1 | 12/2003 | Balachandran et al. |
| 2009/0207812 | A1* | 8/2009 | Gupta et al. .................. 370/332 |
| 2009/0280770 | A1* | 11/2009 | Mahendran ................ 455/404.1 |

(Continued)

FOREIGN PATENT DOCUMENTS

| CN | 1479512 A | 3/2004 |
| CN | 101132614 A | 2/2008 |

(Continued)

OTHER PUBLICATIONS

"$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 9)," 3GPP TS 23.401 V9.3.0, (Dec. 2009), 254 pages.

(Continued)

*Primary Examiner* — Sulaiman Nooristany
(74) *Attorney, Agent, or Firm* — Slater & Matsil, L.L.P.

(57) ABSTRACT

The present invention relates to the communication field and discloses a method, an apparatus, and a system for processing priority services to overcome a problem in the prior art that priority services initiated from a network to a target user cannot be provided. The technical solutions provided in the embodiments of the present invention include: determining a service to be carried out with a target user equipment as a priority service; and creating a priority service bearer for the priority service, and carrying out the priority service by using the priority service bearer. The embodiments of the present invention are applicable in an IMS-based communication system.

18 Claims, 8 Drawing Sheets

(56) References Cited

U.S. PATENT DOCUMENTS

| | | |
|---|---|---|
| 2009/0296688 A1 | 12/2009 | Bakker et al. |
| 2010/0017846 A1 | 1/2010 | Huang et al. |
| 2010/0322151 A1* | 12/2010 | Racz et al. .................. 370/328 |
| 2011/0110302 A1* | 5/2011 | Faurie et al. ................. 370/328 |
| 2011/0176414 A1* | 7/2011 | De Franca Lima et al. .. 370/230 |
| 2011/0189971 A1* | 8/2011 | Faccin et al. ............... 455/404.1 |

FOREIGN PATENT DOCUMENTS

| | | |
|---|---|---|
| CN | 101179763 A | 5/2008 |
| CN | 101227352 A | 7/2008 |
| CN | 101227648 A | 7/2008 |
| CN | 101272256 A | 9/2008 |
| CN | 101294667 A | 10/2008 |
| CN | 101394667 A | 3/2009 |
| CN | 101500213 A | 8/2009 |
| CN | 101577888 A | 11/2009 |
| CN | 101577890 A | 11/2009 |
| WO | WO 03/009627 A1 | 1/2003 |
| WO | WO 2009/100638 A1 | 8/2009 |
| WO | WO 2009/137617 A1 | 11/2009 |

OTHER PUBLICATIONS

"3$^{rd}$ Generation Partnership Project; Technical Specification Group Services and System Aspects Enhancements for Multimedia Priority Service (Release 10)," 3GPP TR 23.8XX 0.1.0, (Jan. 2010), 14 pages.

International Search Report received in Patent Cooperation Treaty Application No. PCT/CN2011/070963, mailed May 12, 2011, 4 pages.

Written Opnion of the International Searching Authority received in Patent Cooperation Treaty Application No. PCT/CN2011/070963, mailed May 12, 2011, 4 pages.

Search Report of Chinese Application No. 201010110642.9, 7 pages.

First Chinese Office Action of Chinese Application No. 201010110642.9, mailed Jul. 4, 2012, 6 pages.

Extended European Search Report received in Application No. 11741922.1-1526, Applicant: Huawei Technologies Co., Ltd., mailed Jan. 22, 2013, 8 pages.

* cited by examiner

METHOD, APPARATUS AND SYSTEM FOR PROCESSING PRIORITY SERVICES

CROSS-REFERENCE TO RELATED APPLICATIONS

This application is a continuation of International Application No. PCT/CN2011/070963, filed on Feb. 12, 2011, which claims priority to Chinese Patent Application No. 201010110642.9, filed on Feb. 12, 2010, both of which are hereby incorporated by reference in their entireties.

FIELD OF THE INVENTION

The present invention relates to the field of communications, and in particular, to a method, an apparatus, and a system for processing priority services.

BACKGROUND OF THE INVENTION

A user may use an IP multimedia subsystem (IP Multimedia Subsystem, IMS) for processing services. The services can be categorized into priority services and non-priority services. A priority service takes priority over a non-priority service.

At the time of carrying out a priority service in the prior art, a priority service bearer needs to be set up between the user equipment (User Equipment, UE) of a calling user and an IP connectivity access network (IP Connectivity Access Network, IP-CAN) accessed by the UE. The UE finishes the IMS registration by using the priority service bearer. A priority service session request of the calling user is routed by an emergency call session control function (Emergency Call Session Control Function, E-CSCF) in the IMS to an emergency call center, and the emergency call center provides the priority service.

However, the prior art supports only the priority service initiated proactively by a calling user, and does not support the priority service initiated from the network to a target user.

SUMMARY OF THE INVENTION

An embodiment of the present invention provides a method, an apparatus and a system for processing priority services, capable of providing priority services initiated from a network side to a target user.

A method for processing priority services provided in an embodiment of the present invention includes: determining a service to be carried out with a target user equipment as a priority service; and creating a priority service bearer for the priority service, and carrying out the priority service by using the priority service bearer.

A method for processing priority services provided in an embodiment of the present invention includes: receiving an IP multimedia subsystem IMS message, determining a service to be carried out with a target user equipment as a priority service according to the IMS message; and sending information indicating that the service is the priority service to an IP connectivity access network device attached by the target user equipment through a policy and charging rules function entity, so that the IP connectivity access network device creates a priority service bearer for the priority service according to the information indicating that the service is the priority service and carries out the priority service by using the priority service bearer.

An IP connectivity access network device provided in an embodiment of the present invention includes:
a determining module, configured to determine a service to be carried out with a target user equipment as a priority service; and
a creating module, configured to create a priority service bearer for the priority service according to a determining result of the determining module, and carry out the priority service by using the priority service bearer.

An IP multimedia subsystem device provided in an embodiment of the present invention includes:
a receiving module, configured to receive an IP multimedia subsystem IMS message;
a determining module, configured to determine a service to be carried out with a target user equipment as a priority service according to the IMS message received by the receiving module; and
a sending module, configured to: send information indicating that the service is the priority service to an IP connectivity access network device attached by the target user equipment through a policy and charging rules function entity, so that the IP connectivity access network device creates a priority service bearer for the priority service according to the information indicating that the service is the priority service and carries out the priority service by using the priority service bearer.

A communication system provided in an embodiment of the present invention includes:
an IP multimedia subsystem device, configured to: receive an IP multimedia subsystem IMS message, determine a service to be carried out with a target user equipment as a priority service according to the IMS message, and send information indicating that the service is the priority service to an IP connectivity access network device attached by the target user equipment through a policy and charging rules function entity; and
the IP connectivity access network device, configured to determine the service as the priority service according to the information indicating that the service is the priority service, create a priority service bearer for the priority service, and carry out the priority service by using the priority service bearer.

In the method, apparatus, and system for processing priority services in the embodiments of the present invention, after it is determined that the service carried out with the target user equipment is a priority service, a priority service bearer is created for the priority service, so that the network device can provide priority services for the target user equipment by using the priority service bearer, so as to overcome a problem in the prior art that priority services initiated from the network to the target user cannot be provided.

Another method for processing priority services provided in an embodiment of the present invention includes: receiving a first session request message sent by a calling user equipment, where the first session request message carries information indicating that a service is a priority service; according to the information indicating that the service is the priority service, triggering a target user equipment to send an access request to an IP connectivity access network, so that the IP connectivity access network creates a priority service bearer corresponding to the priority service and registers the target user equipment with an IP multimedia subsystem by using the priority service bearer; receiving a second session request message that is corresponding to the priority service and is sent by the target user equipment; and creating a correlation relationship between a session indicated by the second session request message and a session indicated by the first session request message, and carrying out the priority service by using the priority service bearer.

In the technical solutions of the another method for processing priority services provided in the embodiments of the present invention, according to information which indicates that the service is a priority service and which is carried in the first session request message sent by the calling user equipment, the target user equipment is triggered to initiate an access procedure to a network, a priority service bearer is created, and the user equipment is registered with the IP multimedia subsystem; the second session request message is sent by the target user equipment, the correlation relationship between the session indicated by the second session request message and the session indicated by the first session request message is set up, and the priority service is carried out by using the priority service bearer, thereby overcoming a problem in the prior art that priority services initiated from the network to the target user cannot be provided.

A back-to-back application server provided in an embodiment of the present invention includes:

a first receiving module, configured to receive a first session request message sent by a calling user equipment, where the first session request message carries information indicating that the service is a priority service;

a triggering module, configured to trigger, according to the information which indicates that a service is the priority service and which is received by the first receiving module, a target user equipment to send an access request to an IP connectivity access network, so that the IP connectivity access network creates a priority service bearer corresponding to the priority service and registers the target user equipment with an IP multimedia subsystem by using the priority service bearer;

a second receiving module, configured to receive a second session request message that is corresponding to the priority service and is sent by the target user equipment; and a service module, configured to create a correlation relationship between a session indicated by the second session request message received by the second receiving module and a session indicated by the first session request message received by the first receiving module, and carry out the priority service by using the priority service bearer.

With the back-to-back application server described above, according to information which indicates that the service is a priority service and which is carried in the first session request message sent by the calling user equipment, the target user equipment is triggered to initiate an access procedure to a network, a priority service bearer is created, and the user equipment is registered with the IP multimedia subsystem; the second session request message is sent from the target user equipment, the correlation relationship between the session indicated by the second session request message and the session indicated by the first session request message is set up, and the priority service is carried out by using the priority service bearer, thereby overcoming a problem in the prior art that priority services initiated from the network to the target user cannot be provided.

BRIEF DESCRIPTION OF THE DRAWINGS

To illustrate the technical solutions of the embodiments of the present invention or the prior art more clearly, the following outlines the accompanying drawings involved in the description of the embodiments of the present invention or the prior art. Apparently, the accompanying drawings described below are merely about some embodiments of the present invention, and persons of ordinary skill in the art can derive other drawings from them without making any creative effort.

DETAILED DESCRIPTION OF THE EMBODIMENTS

The technical solutions of the embodiments of the present invention are clearly and completely described in following with reference to the accompanying drawings in the embodiments of the present invention. Evidently, the embodiments to be described are merely about some rather than all embodiments of the present invention. All other embodiments, which can be derived by those skilled in the art from the embodiments of the present invention without making any creative effort, shall fall within the protection scope of the present invention.

To overcome a problem in the prior art that priority services initiated from a network to a target user cannot be provided, embodiments of the present invention provides a method, an apparatus and a system for processing priority services.

Figure 1:
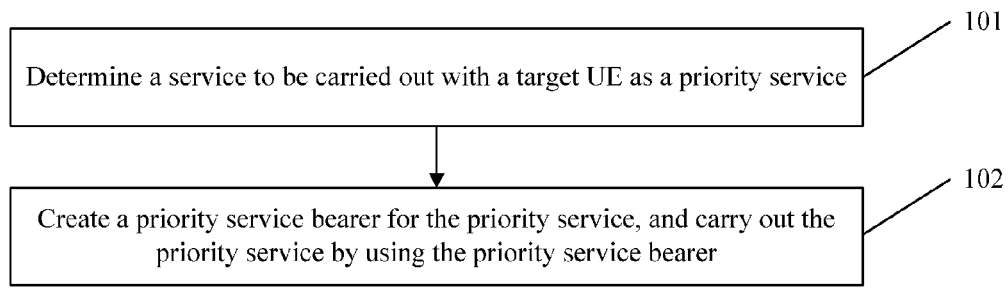
FIG. 1 is a flowchart of a method for processing priority services according to an embodiment of the present invention.

As shown in FIG. 1, a method for processing priority services provided in this embodiment of the present invention includes:

Step 101: Determine a service to be carried out with a target UE as a priority service.

In this embodiment, step 101 may be implemented in two methods:

The first method is: receiving first signaling corresponding to the service to be carried out with the target UE; and determining that the service is a priority service if the first signaling carries information indicating that the service is the priority service, that is to say, determining that the service to be carried out with the target UE is the priority service according to service priority indication information carried in control information corresponding to the service to be carried out. The first signaling may include: an IP-CAN session modification message, an update bearer request message (Update Bearer request), a create bearer request message (Create Bearer request), a bearer modify request message (Bearer Modify Request), or a bearer setup request message (Bearer setup request).

The other method is: receiving service data of the service to be carried out with the target UE if a network device has created a service bearer (including a priority service bearer) for the service, and determining that the service is a priority service if the service data is transmitted by using the priority service bearer, that is to say, determining whether the service to be carried out with the target UE is a priority service by checking whether the service data of the service to be carried out is transmitted by using the priority service bearer.

Definitely, the two methods above are examples only. In practical applications, in step 101, the service to be carried out with the target UE may be determined as a priority service in other methods, and the methods are not described exhaustively here any further.

Step 102: Create a priority service bearer for the priority service, and carry out the priority service by using the priority service bearer.

In this embodiment, if an ordinary service bearer (non-priority service bearer) has been created for the target UE, the operations in step 102 may be: updating the ordinary service bearer to the priority service bearer corresponding to the priority service, or re-allocating a bearer resource to the priority service and creating a new priority service bearer; if no ordinary service bearer has been created for the target UE, the method described in step 102 is: allocating a bearer resource to the priority service, and creating a new priority service bearer, that is, creating a priority service bearer corresponding to the priority service.

In step 102 in this embodiment, after a priority service bearer is created, session information of the priority service bearer may be transmitted over the priority service bearer, thereby priority services from a network to a target user are provided.

Optionally, the method for processing priority services provided in this embodiment may further include:

if the target UE is in an idle state, sending second signaling to a mobility management entity (Mobility Management Entity, MME), where the second signaling carries information indicating that the service is a priority service, so that the MME initiates paging to the target UE to initiate a network access procedure of the target UE.

In this embodiment, the second signaling may include a downlink data notification (downlink data notification) message, or an update bearer request message (Update Bearer request), or a create bearer request message (Create Bearer request).

Further, in this embodiment, the step of the MME initiating paging to the target UE to initiate the network access procedure of the target UE may include:

Firstly, the MME sends a first paging message to a base station (such as an eNB) attached by the target UE, where the first paging message carries information indicating that the service is a priority service.

In this embodiment, the first paging message further carries a temporary identifier of the target UE, where the temporary identifier is used to identify the UE to be paged, namely, the target UE.

Then, the base station sends a second paging message to the target UE according to the first paging message. Optionally, the second paging message may carry the indication information indicating that the service is a priority service.

In this embodiment, the base station may store, according to the first paging message, the mapping relationship between the temporary identifier and the information indicating that the service is a priority service.

Thirdly, the target UE initiates a network access procedure according to the second paging message.

Further, during the network access procedure of the target UE, the method for processing priority services provided in this embodiment of the present invention may further include:

receiving the information which indicates that the service is a priority service and which is sent by the target UE; and according to the information indicating that the service is the priority service, ensuring that the target UE preferentially accesses the network.

Optionally, in this embodiment, during the network access procedure of the target UE, the target UE may send a temporary identifier. Whether the information which indicates that the service is the priority service and which is corresponding to the temporary identifier exists is checked according to the temporary identifier; if such information exists, it is ensured that the target UE preferentially accesses the network.

In the method for processing priority services provided in this embodiment of the present invention, after it is determined that the service is a priority service, a priority service bearer is created for the priority service, so that a network device can provide priority services for the target user equipment by using the priority service bearer, thereby overcoming a problem in the prior art that the priority services from a network to a target user cannot be provided.

Figure 2:
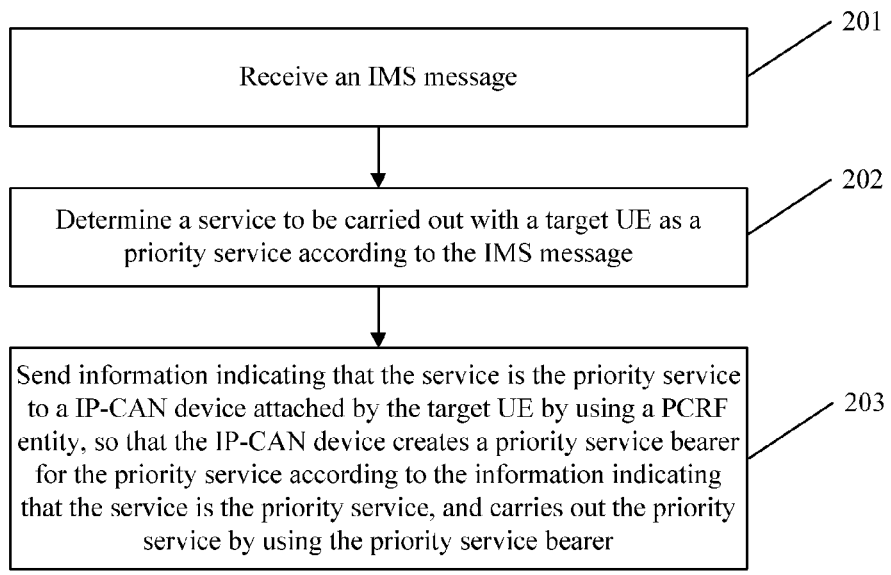
FIG. 2 is a flowchart of a method for processing priority services according to another embodiment of the present invention.

As shown in FIG. 2, an embodiment of the present invention provides another method for processing priority services, including:

Step 201: Receive an IMS message.

In this embodiment, the IMS message may be a session request message.

Step 202: Determine a service to be carried out with a target UE as a priority service according to the IMS message received in step 201.

In step 202 in this embodiment, the received IMS message (such as a session request message) may be parsed, a service type of a service requested by the IMS message is obtained from the message, and it is determined that the service is a priority service according to the service type; or, it may be determined that the service is a priority service according to information which indicates that the service is a priority service and which is carried in the IMS message. Definitely, in practical applications, there may be other determining methods, which are not described here exhaustively.

Step 203: Send the information indicating that the service is the priority service to an IP-CAN device attached by the target UE through a policy and charging rules function (Policy and Charging Rules Function, PCRF) entity, so that the IP-CAN device creates a priority service bearer for the priority service according to the information indicating that the service is the priority service, and carries out the priority service by using the priority service bearer.

Further, step 203 may include:

sending first information to the PCRF, where the first information carries the information indicating that the service is the priority service; and making, by the PCRF, a service decision according to the first information, generating PCC (policy and charging control, policy and charging control) rule information, and sending the PCC rule information to the IP-CAN device, where the PCC rule information carries the information indicating that the service is the priority service, so that the IP-CAN device creates a priority service bearer for the priority service according to the information indicating that the service is the priority service.

In the method for processing priority services provided in this embodiment of the present invention, after it is determined that the service carried out with the target UE is a priority service, information indicating that the service is the priority service is sent to the device in the IP-CAN network attached by the target UE through the PCRF, so that the device in the IP-CAN network can create a priority service bearer for the priority service according to the information, the network device can provide priority services for the target user equipment by using the priority service bearer, thereby overcoming a problem in the prior art that priority services from the network to the target user cannot be provided.

To make persons skilled in the art clearly understand the technical solutions of the embodiment of the present invention, the method for processing priority services provided in this embodiment of the present invention is described in detail through specific examples.

Figure 3:
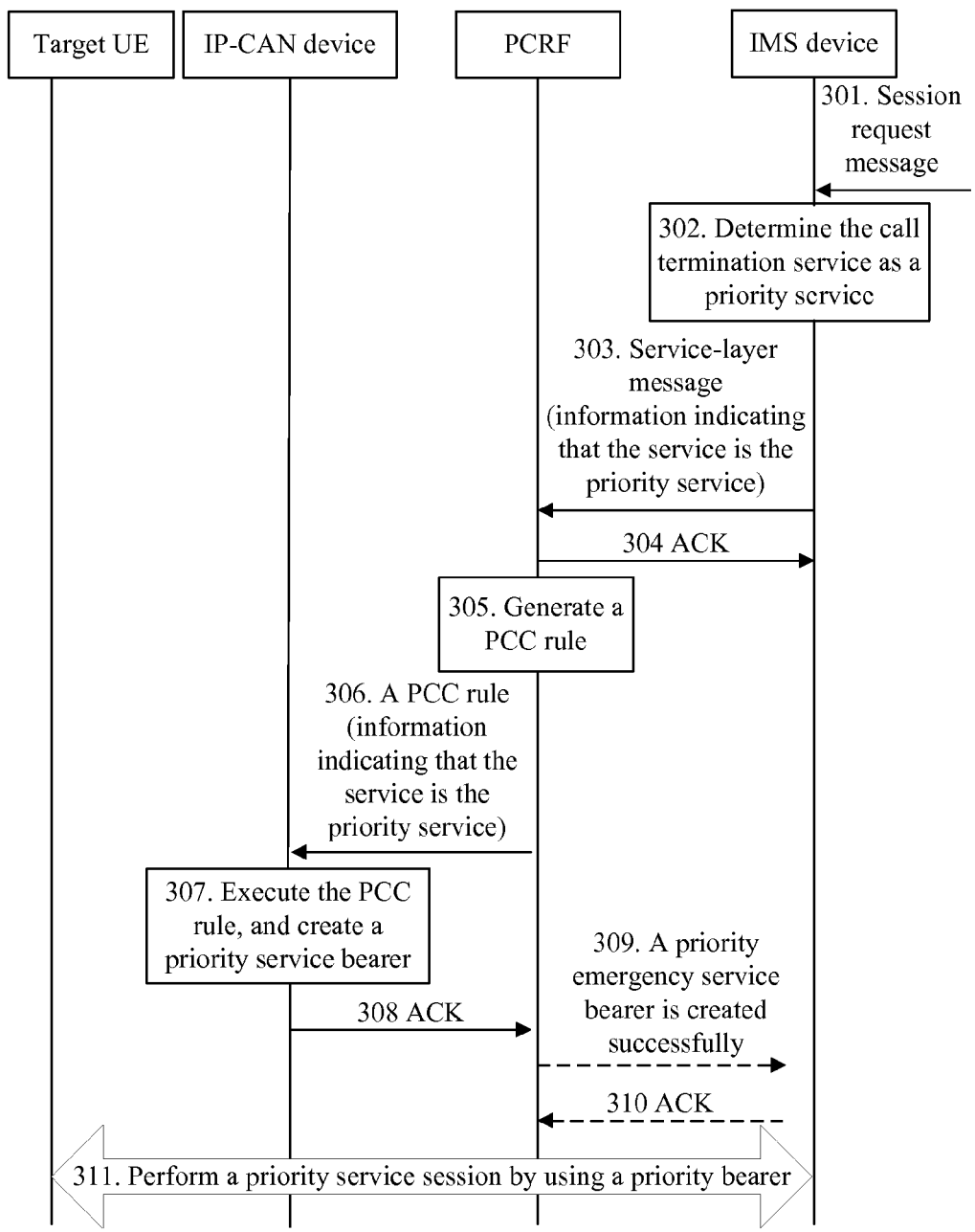
FIG. 3 is a sequence diagram of a method for processing priority services according to another embodiment of the present invention.

As shown in FIG. 3, another embodiment of the present invention provides a method for processing priority services, including:

Step 301: An IMS device receives a session request message, where the IMS device may be a P-CSCF (proxy-call session control function, proxy-call session control function), an application function (application function, AF) entity, or the like.

Step 302: The IMS device determines a service to be carried out with a target UE as a priority service according to the session request message received in step 301.

In this embodiment, the service to be carried out between the IMS device and the target UE may be initiated by a network or a calling UE.

In step 302, the session request message received in step 301 may be parsed to obtain a service type of a service requested by the session request message, and the service is determined as the priority service according to the service type; or, the service is determined as the priority service according to the information which indicates that the service is the priority service and which is carried in the session request message.

Step 303: The IMS device sends service-layer information to the PCRF, where the service-layer information carries the information indicating that the service is the priority service.

In this embodiment, the information indicating that the service is the priority service may be priority service session indication information, for example, identifier information corresponding to the priority service or priority information corresponding to the priority service; or the service-layer information includes priority service indication, for example, information of quality of service includes information of the priority service, and details are not described here exhaustively.

Step 304: The PCRF stores the service-layer information, and feeds back acknowledgement information (ACK) to the IMS device.

Step 305: The PCRF makes a service decision according to service information, and generates a PCC rule corresponding to the priority service.

Step 306: The PCRF sends the PCC rule corresponding to the priority service to an IP-CAN device, where the PCC rule carries the information indicating that the service is the priority service.

In this embodiment, the PCC rule can be sent through an IP-CAN session modification message.

The IP-CAN device may be a policy and charging enforcement function (Policy and Charging Enforcement Function, PCEF) entity, a packet data network gateway (PDN Gateway, P-GW), or the like.

Step 307: The IP-CAN device executes the PCC rule, and creates a priority service bearer for the priority service according to the information which is carried in the PCC rule and which indicates that the service is a priority service.

Step 308: The IP-CAN device returns an acknowledgement message (ACK) to the PCRF. The acknowledgement message is used to indicate that the IP-CAN accepts the PCC rule provided by the PCRF, and that the IP-CAN creates a priority bearer for the priority service successfully.

Optionally, in step 309, the PCRF notifies the IMS device that the priority service bearer corresponding to the priority service is created successfully.

Optionally, in step 310, the IMS device returns an acknowledgement message (ACK) to the PCRF.

Step 311: The IMS device sends session information of the priority service to the target UE by using the priority service bearer created in step 307 to perform a priority service session with the target UE.

In this embodiment, step 309 and step 310 are optional. The IMS device may preset a timer. In step 303, the IMS device starts the timer when sending the service-layer information to the PCRF. When the duration of the timer expires, the IMS device may, by default, regard that the priority service bearer is created successfully, and performs the subsequent step 311; or, the IMS device may perform step 311 concurrently when sending the service-layer information to the PCRF, and send session request information to the PCEF/PGW.

Figure 4:
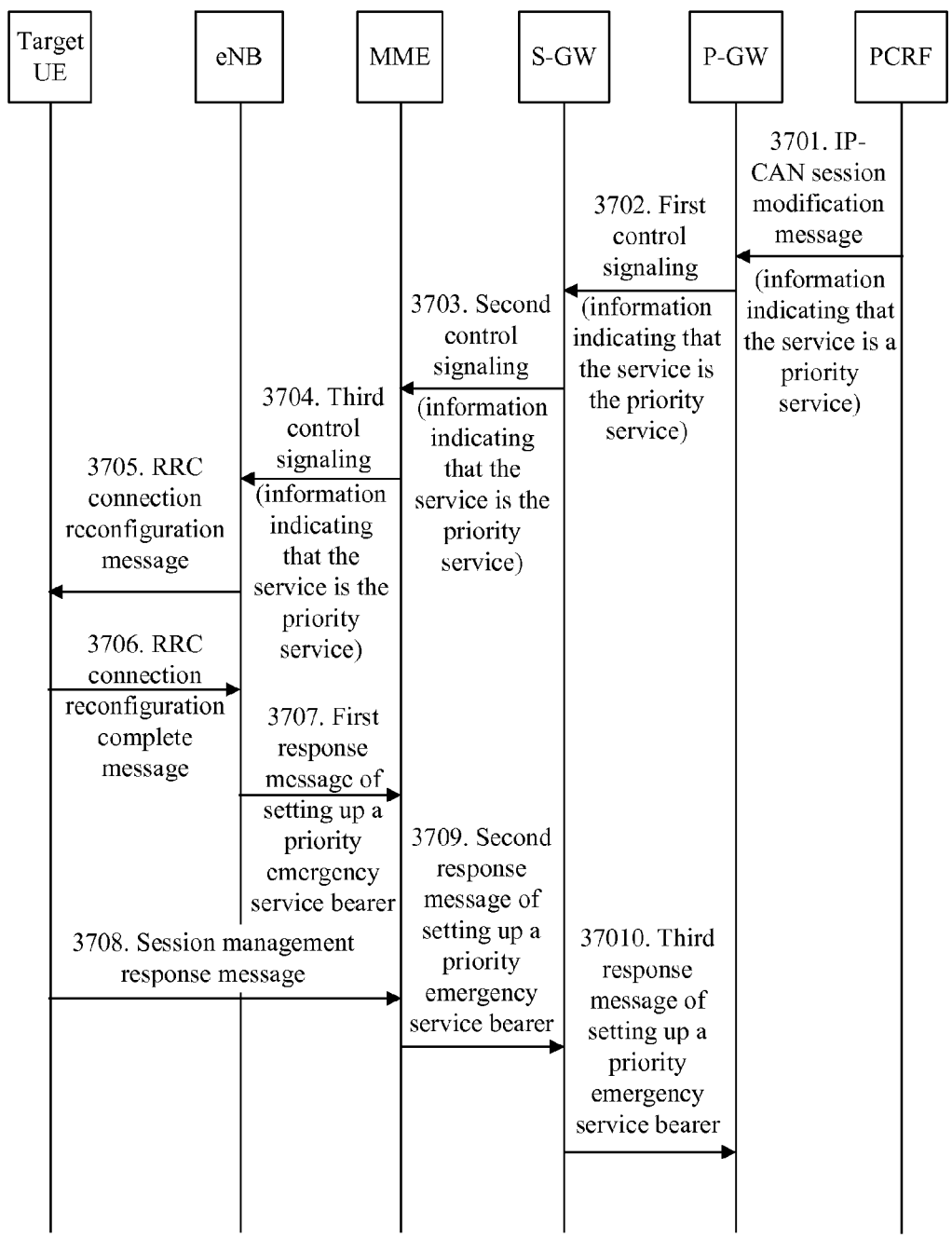
FIG. 4 is a sequence diagram of step 307 illustrated in FIG. 3.

Further, as shown in FIG. 4, the details of step 307 may include:

Step 3071: The P-GW receives the IP-CAN session modification message delivered by the PCRF, where the IP-CAN session modification message includes the information indicating that the service is the priority service. The P-GW determines that the service is the priority service according to the information indicating that the service is the priority service, and creates a priority service bearer for the priority service. For the detailed method of creating the priority service bearer, reference may be made to step 102 in FIG. 1, and details are not described herein again.

Step 3072: The P-GW sends first control signaling corresponding to the priority service to an S-GW (Serving gateway, serving gateway). The first control signaling carries the information indicating that the service is the priority service. According to the information indicating that the service is the priority service, the S-GW determines that the service is the priority service, and creates a priority service bearer for the priority service.

The first control signaling may be an update bearer request message (Update Bearer request), or a create bearer request message (Create Bearer request).

When the first control signaling is an Update Bearer request, the S-GW updates an ordinary service bearer (non-priority service bearer) already created for the target UE to a priority service bearer corresponding to the priority service; when the first control signaling is a Create Bearer request, the S-GW allocates a bearer resource to the priority service, and creates a new priority service bearer, that is, according to the bearer resource allocated to the priority service, creates a priority service bearer corresponding to the service to be carried out with the target UE.

Step 3073: The S-GW sends second control signaling corresponding to the priority service to an MME. The second control signaling carries the information indicating that the service is the priority service. According to the information indicating that the service is the priority service, the MME determines the service as the priority service.

The second control signaling may be an update bearer request message (Update Bearer request), or a create bearer request message (Create Bearer request).

Step 3074: The MME sends third control signaling corresponding to the priority service to an eNB. The third control signaling carries the information indicating that the service is the priority service. According to the information indicating that the service is the priority service, the eNB determines the service as the priority service, creates a priority service bearer for the priority service, and ensures that this bearer is created preferentially.

The third control signaling may be a bearer modify request (Bearer Modify Request), or a bearer setup request (Bearer setup request).

When the third control signaling is a Bearer Modify Request, the eNB updates an ordinary service bearer (non-priority service bearer) already created for the target UE to a priority service bearer corresponding to the priority service; when the third control signaling is a Bearer setup request, the eNB allocates a bearer resource to the priority service, and creates a new priority service bearer.

Further, in this embodiment, the third control signaling sent by the MME to the eNB may further include session management request message sent to the target UE. The session management request information may also carry the information indicating that the service is the priority service.

Step 3075: The eNB sends an RRC connection reconfiguration message to the target UE to set up a radio resource corresponding to the priority service.

Step 3076: The target UE returns an RRC connection reconfiguration complete message to the eNB.

Step 3077: The eNB returns a first response message of setting up a priority service bearer to the MME.

The first response message of setting up a priority service bearer may be a bearer modify response message (Bearer Modify Response), or a bearer setup response message (Bearer Setup Response).

Further, in step 3078, the UE returns a session management response message to the MME.

Step 3079: The MME returns a second response message of setting up a priority service bearer to the S-GW.

The second response message of setting up a priority service bearer may be an update bearer response message (Update Bearer Response), or a create bearer response message (Create Bearer Response).

Step 30710: The S-GW returns a third response message of setting up a priority service bearer to the P-GW.

The third response message of setting up a priority service bearer may be an update bearer response message (Update Bearer Response), or a create bearer response message (Create Bearer Response).

In this embodiment, the information indicating that the service is the priority service may be priority identifier information or may be a special QoS parameter.

In the method for processing priority services provided in this embodiment of the present invention, after it is determined that the service carried out with the target user equipment is a priority service, a priority service bearer is created for the priority service, so that a network device can provide priority services for the target user equipment by using the priority service bearer, thereby overcoming a problem in the prior art that priority services initiated from the network to the target user cannot be provided.

Another embodiment of the present invention provides a method for processing priority services. This method is basically the same as the methods illustrated in FIG. 3 and FIG. 4, and the difference lies in that:

After step 3072, this method further includes:

Firstly, according to the stored state information of the target UE, the S-GW determines that the target UE is in an idle state, and sends fourth control signaling to the MME, where the fourth control signaling carries the information indicating that the service is the priority service.

In this embodiment, the fourth control signaling may be a downlink data notification message (downlink data notification), or an update bearer request message (Update Bearer request), a create bearer request message (Create Bearer request), or the like.

Then, the MME sends a first paging message to the eNB according to the fourth control signaling. The first paging message carries the information indicating that the service is the priority service, so that after the eNB receives the indication, the eNB can ensure that the paging is performed even if a network is congested.

Thirdly, the eNB sends a second paging message to the target UE according to the first paging message. The second paging message may carry the information indicating that the service is the priority service.

Further, the first paging message carries a temporary identifier. According to the first paging message, the eNB may store the mapping relationship between the temporary identifier and the information indicating that the service is the priority service. In this case, the second paging message does not need to carry the information indicating that the service is the priority service.

Further, the eNB may maintain a lifecycle for each stored correspondence between the temporary identifier and the information indicating that the service is a priority service, for example, sets a timer, and upon expiry of the timer, deletes the correspondence between the temporary identifier and the information indicating that the service is a priority service.

Fourthly, the target UE initiates a network access procedure according to the second paging message.

Further, during the network access procedure of the target UE, the method for processing priority services provided in this embodiment may further include:

receiving information that is sent by the target UE and indicates that the service is a priority service; and providing priority services for the target UE according to the information indicating that the service is the priority service, and ensuring access to a network even if a base station is congested.

Optionally, during the network access procedure of the target UE, the target UE may send a temporary identifier. Whether the information which is corresponding to the temporary identifier and which indicates that the service is a priority service exists is checked according to the temporary identifier; if such information exists, priority services are provided for the target UE.

Figure 5:
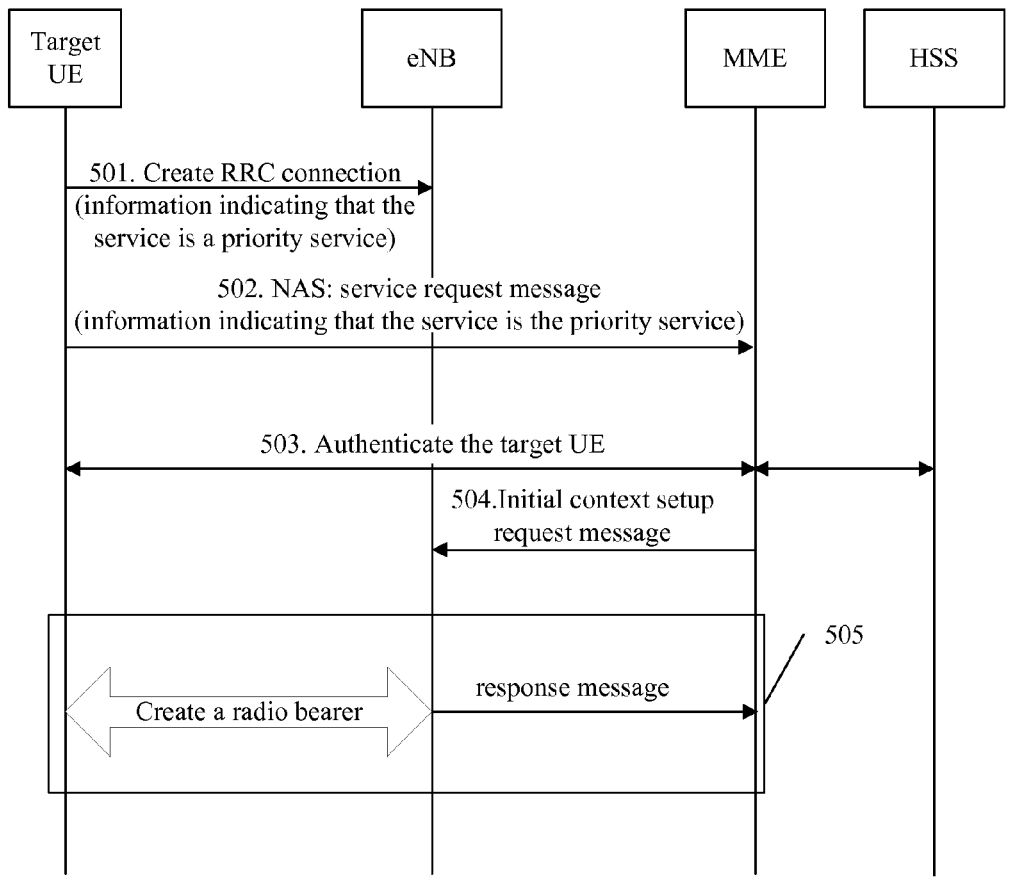
FIG. 5 is a sequence diagram of a process in which a target UE sends a priority service request to an MME according to a paging message in a method for processing priority services provided in another embodiment of the present invention.

As shown in FIG. 5, the detailed step of the target UE initiating the network access procedure to the MME according to the second paging message may include:

Step 501: The target UE creates RRC connection with the eNB. In the process of creating the RRC connection, the target UE may send, to the eNB, information indicating that the service is a priority service, so that the eNB may not reject the RRC setup request of the target UE even if resources are hardly enough.

Alternatively, the eNB may obtain a temporary identifier from the RRC setup message sent by the UE, and check whether information which is corresponding to the temporary identifier and which indicates that the service is the priority service exists. If such information exists, the eNB may not reject the RRC setup request of the target UE even if the resources are hardly enough. In this case, the stored mapping relationship between the temporary identifier and the information indicating that the service is the priority service can be deleted.

Step 502: The target UE sends a Non Access Stratum (NAS) message to the MME. The NAS message may carry the information indicating that the service is the priority service, so that the MME can allocate resources to the target UE preferentially.

In this embodiment, the NAS message is specifically a service request message.

Step 503: The MME obtains security information of the target UE from an HSS according to the NAS, and authenticates the target UE.

Step 504: The MME sends an initial context setup request message to the eNB.

Step 505: The eNB creates a corresponding radio resource according to the initial context setup request message, and returns a response message to the MME to finish the network access procedure.

Optionally, in this embodiment, if the P-GW has created a priority service bearer, the P-GW may send service data of the service to the S-GW directly by using the priority service bearer. The S-GW may determine the service as a priority service according to the priority service bearer used for the service data. In this case, in step 3073, the information, which indicates that a downlink service is the priority service and which is carried in the control signaling downlink data notification message sent by the S-GW to the MME, may be a bearer identifier of the priority service bearer, or may be information indicating that the service is the priority service.

In the method for processing priority services provided in this embodiment of the present invention, after it is determined that the service carried out with the target user equipment is a priority service, a priority service bearer is created for the priority service, so that a network device can provide priority services for the target user equipment by using the priority service bearer, thereby overcoming a problem in the prior art that quality of service of priority services initiated from a network to a target user cannot be provided.

Figure 6:
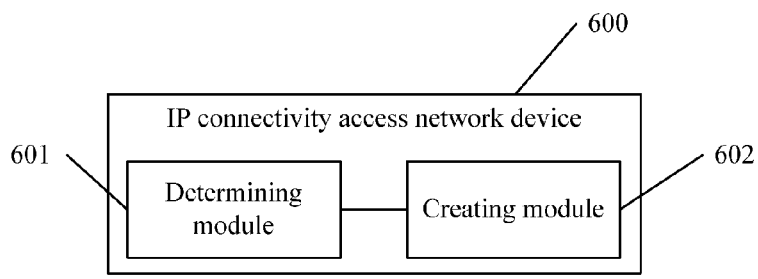
FIG. 6 is a first schematic structural diagram of an IP connectivity access network device according to an embodiment of the present invention.

As shown in FIG. 6, an embodiment of the present invention provides an IP connectivity access network device 600, including:

a determining module 601, configured to determine a service to be carried out with a target user equipment as a priority service; and a creating module 602, configured to create a priority service bearer for the priority service according to a determining result of the determining module 601, and carry out the priority service by using the priority service bearer.

Figure 7:
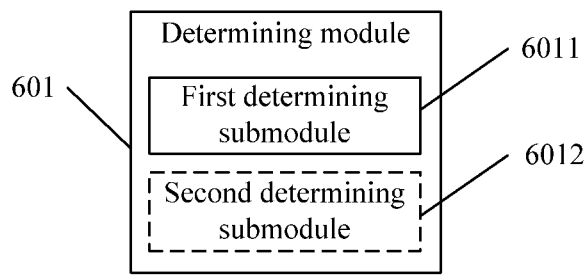
FIG. 7 is a schematic structural diagram of a determining module shown in FIG. 6.

Further, as shown in FIG. 7, the determining module 601 may include:

a first determining sub-module 6011, configured to receive first signaling corresponding to the service, and determine that the service is the priority service if the first signaling carries information indicating that the service is the priority service; or a second determining sub-module 6012, configured to receive service data of the service, and determine that the service is the priority service if the service data is transmitted by using a priority service bearer.

Figure 8:
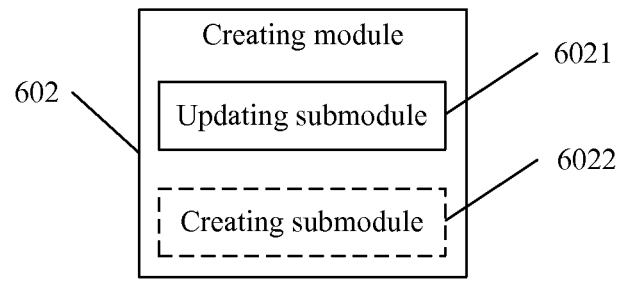
FIG. 8 is a schematic structural diagram of a creating module shown in FIG. 6.

Further, as shown in FIG. 8, the creating module 602 may include:

an updating sub-module 6021, configured to update a service bearer already created for the target user equipment to a priority service bearer corresponding to the priority service; or a creating sub-module 6022, configured to allocate a bearer resource to the priority service and create a new priority service bearer.

Figure 9:
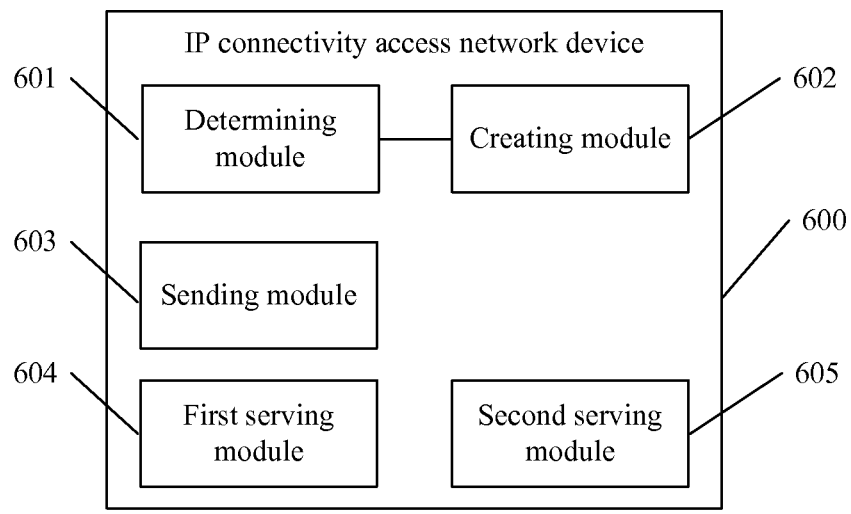
FIG. 9 is a second schematic structural diagram of an IP connectivity access network device according to an embodiment of the present invention.

Further, as shown in FIG. 9, the IP connectivity access network device 600 provided in this embodiment of the present invention may further include:

a sending module 603, configured to send second signaling to a mobility management entity, where the second signaling carries information indicating that the service is the priority service, so that the mobility management entity initiates paging to the target user equipment to initiate a network access procedure of the target user equipment.

Further, as shown in FIG. 9, the IP connectivity access network device 600 provided in this embodiment of the present invention may include:

a first serving module 604, configured to receive information, which indicates that the service is a priority service and which is sent by the target user equipment, during the network access procedure of the target user equipment, and according to the information indicating that the service is the priority service, ensure that the target user equipment is served preferentially; or a second serving module 605, configured to receive a temporary identifier of the target user equipment during the network access procedure of the target user equipment, determine the information which is corresponding to the temporary identifier and which indicates that the service is the priority service, and ensure that the target user equipment accesses the network preferentially.

The IP connectivity access network device provided in this embodiment of the present invention may be a P-GW, an S-GW, an eNB, an SGSN, an RNC/BSC, or the like.

For the detailed implementation method of the IP connectivity access network device provided in this embodiment of the present invention, reference may be made to the method for processing priority services in the embodiments of the present invention.

With the IP connectivity access network device provided in this embodiment of the present invention, after it is determined that the service carried out with the target user equipment is a priority service, a priority service bearer is created for the priority service, so that the network device can provide priority services for the target user equipment by using the priority service bearer, thereby overcoming a problem in the prior art that priority services initiated from the network to the target user cannot be provided.

Figure 10:
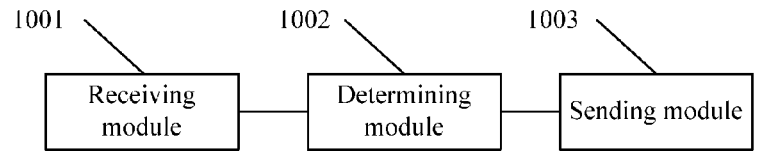
FIG. 10 is a schematic structural diagram of an IP multimedia subsystem according to an embodiment of the present invention.

As shown in FIG. 10, an embodiment of the present invention provides an IP multimedia subsystem device, including:

a receiving module 1001, configured to receive an IMS message;

a determining module 1002, configured to determine a service to be carried out with a target user equipment as a priority service according to the IMS message received by the receiving module 1001; and a sending module 1003, configured to: send information indicating that the service is the priority service to an IP connectivity access network device attached by the target user equipment through a policy and charging rules function entity, so that the IP connectivity access network device creates a priority service bearer for the priority service according to the information indicating that the service is the priority service, and carries out the priority service by using the priority service bearer.

The IP multimedia subsystem device provided in this embodiment of the present invention may be a P-CSCF, an AF, or the like.

For the detailed implementation method of the IP multimedia subsystem device provided in this embodiment of the present invention, reference may be made to the method for processing priority services in the embodiments of the present invention, and details are not described herein again.

In the IP multimedia subsystem device provided in this embodiment of the present invention, after it is determined that the service carried out with the target UE is a priority service, information indicating that the service is a priority service is sent to a device in the IP-CAN network attached by the target UE through the PCRF, so that the device in the IP-CAN network can create a priority service bearer for the priority service according to the information, and a network device can provide priority services for the target user equipment by using the priority service bearer, thereby overcoming a problem in the prior art that priority services initiated from the network to the target user cannot be provided.

Figure 11:
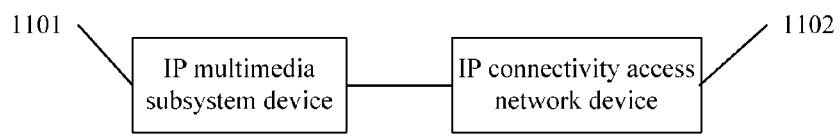
FIG. 11 is a schematic structural diagram of a communication system according to an embodiment of the present invention.

As shown in FIG. 11, an embodiment of the present invention provides another communication system, including:

an IP multimedia subsystem device 1101, configured to: receive an IMS message, determine a service to be carried out with a target user equipment as a priority service according to the IMS message, and send information indicating that the service is the priority service to an IP connectivity access network device 1102 attached by the target user equipment through a policy and charging rules function entity; and the IP connectivity access network device 1102, configured to determine the service as a priority service according to the information indicating that the service is the priority service, create a priority service bearer for the priority service, and carry out the priority service by using the priority service bearer.

For the detailed implementation method of the communication system provided in this embodiment of the present invention, reference may be made to the method and apparatus for processing priority services described in the embodiments of the present invention, and details are not described herein again.

With the communication system provided in this embodiment of the present invention, after it is determined that the service carried out with the target user equipment is a priority service, a priority service bearer is created for the priority service, so that a network device can provide priority services for the target user equipment by using the priority service bearer, thereby overcoming a problem in the prior art that priority services initiated from a network to a target user cannot be provided.

To overcome a problem in the prior art that priority services initiated from a network to a target user cannot be provided, embodiments of the present invention provide a method and an apparatus for processing priority services.

Figure 12:
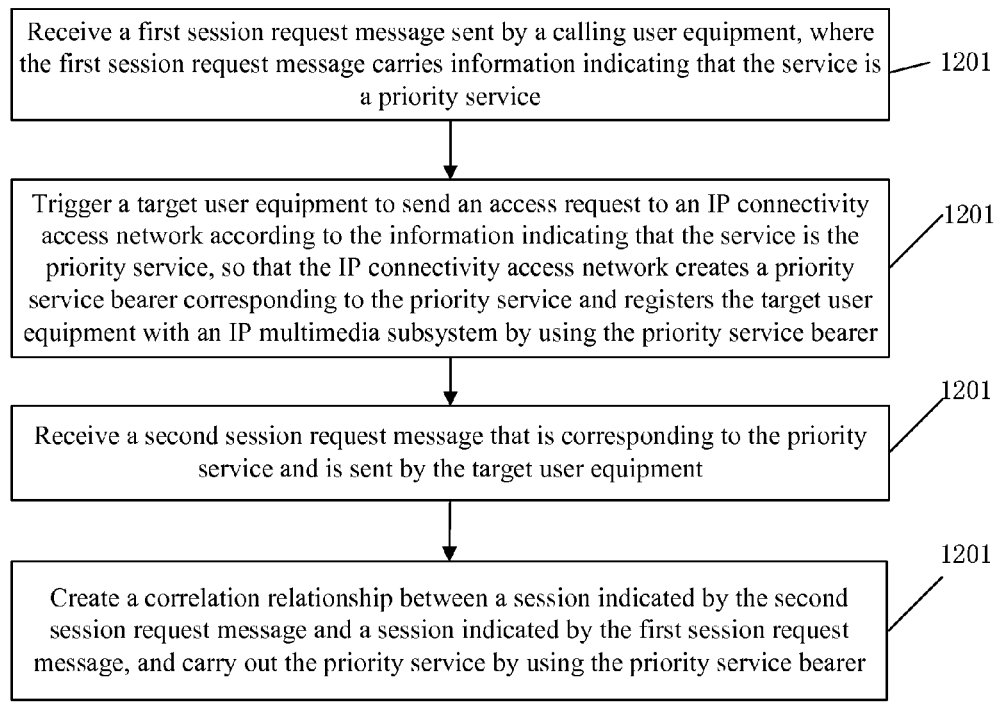
FIG. 12 is a flowchart of a method for processing priority services according to an embodiment of the present invention.

As shown in FIG. 12, a method for processing priority services provided in this embodiment of the present invention includes:

Step 1201: Receive a first session request message sent by a calling user equipment, where the first session request message carries information indicating that a service is a priority service.

Step 1202: According to the information which indicates that the service is the priority service and which is received in step 1201, trigger a target user equipment to send an access request to an IP connectivity access network, so that the IP connectivity access network creates a priority service bearer corresponding to the priority service and registers the target user equipment with an IP multimedia subsystem by using the priority service bearer.

Step 1203: Receive a second session request message that is corresponding to the priority service and is sent by the target user equipment.

Step 1204: Create a correlation relationship between a session indicated by the second session request message and a session indicated by the first session request message, and carry out the priority service by using the priority service bearer.

Further, in the process of triggering, according to the information indicating that the service is the priority service, the target user equipment to send the access request to the IP connectivity access network, an IP-CAN device on a network side determines the service as the priority service according to the information indicating that the service is the priority service, so that a session corresponding to the priority service is carried out preferentially, and it is ensured that the session corresponding to the priority service can be transmitted normally even if network resources are not enough.

In the method for processing priority services provided in this embodiment of the present invention, according to the information which indicates that the service is a priority service and which is carried in the first session request message sent by the calling user equipment, the target user equipment is triggered to initiate an access procedure to a network, a priority service bearer is created, and the user equipment is registered with the IP multimedia subsystem; the second session request message is received from the target user equipment, the correlation relationship between the session indicated by the second session request message and the session indicated by the first session request message is set up, and the priority service is carried out by using the priority service bearer, thereby overcoming a problem in the prior art that priority services initiated from a network to a target user cannot be provided.

To make persons skilled in the art clearly understand the technical solutions of the embodiments of the present invention, the method for processing priority services provided in this embodiment of the present invention is described in detail with specific examples.

Figure 13:
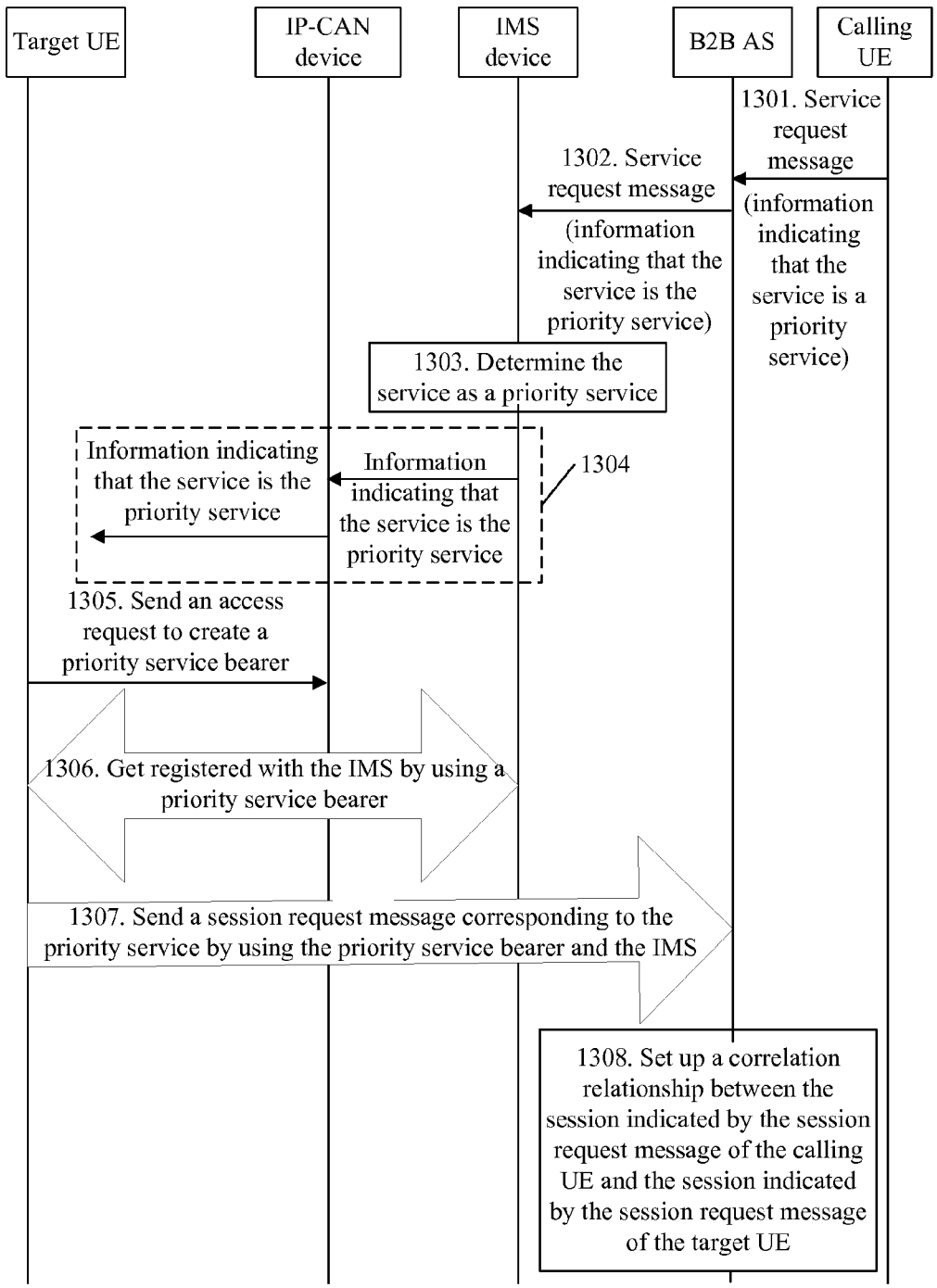
FIG. 13 is a sequence diagram of a method for processing priority services according to another embodiment of the present invention.

As shown in FIG. 13, a method for processing priority services provided in another embodiment of the present invention includes:

Step 1301: A B2B AS receives a service request message sent by a calling UE. The service request carries information indicating that a service is a priority service.

Step 1302: The B2B AS forwards the service request message to an IMS device. The service request carries the information indicating that the service is the priority service.

In this embodiment, the IMS device is specifically a P-CSCF or an AF.

Step 1303: The IMS device determines a service to be carried out between the calling UE and a target UE as the priority service according to the service request message.

In this embodiment, in step 1303, the received session request message may be parsed to obtain a service type requested by the session request message, and the service to be carried out between the calling UE and the target UE is determined as a priority service according to the service type; or, the service may be determined as a priority service according to the information which indicates that the service is the priority service and which is carried in the session request message. Definitely, in practical applications, there may be other determining methods, which are not described here exhaustively.

Step 1304: The IMS sends the information indicating that the service is the priority service to the target UE by using an IP-CAN device.

Further, in this embodiment, according to the information indicating that the service is the priority service, the IP-CAN device determines the service as the priority service, so that a session corresponding to the priority service is carried out preferentially, and it is ensured that the session corresponding to the priority service can be transmitted normally even if network resources are not enough.

Step 1305: According to the information indicating that the service is the priority service, the target UE sends an access request to the IP-CAN, and creates a priority service bearer directed to the IP-CAN.

Step 1306: The target UE gets registered with the IMS by using the priority service bearer created in step 1305.

Step 1307: After being registered with the IMS successfully, the target UE sends a session request message corresponding to the priority service to the B2B AS by using the priority service bearer and the IMS.

Step 1308: The B2B AS sets up a correlation relationship between a session indicated by the session request message sent by the target UE in step 1307 and the session indicated by the session request message sent by the calling UE in step 1301.

Specifically, the session request message that is corresponding to the priority service and is sent by the target UE carries a special session transfer number (Session transfer number, STN). The STN ensures that the session request message that is corresponding to the priority service and is sent by the target UE is routed to the B2B AS. The B2B AS correlates the session request message of the calling UE with the session request message sent by the target UE.

In the method for processing priority services provided in this embodiment of the present invention, according to information which indicates that the service is a priority service and which is carried in a first session request message sent by the calling user equipment, the target user equipment is triggered to initiate an access procedure to a network, a priority service bearer is created, and the user equipment is registered with the IP multimedia subsystem; a second session request message is received from the target user equipment, a correlation relationship between a session indicated by the second session request message and a session indicated by the first session request message is set up, and the priority service is carried out by using the priority service bearer, thereby overcoming a problem in the prior art that priority services initiated from the network to the target user cannot be provided.

Figure 14:
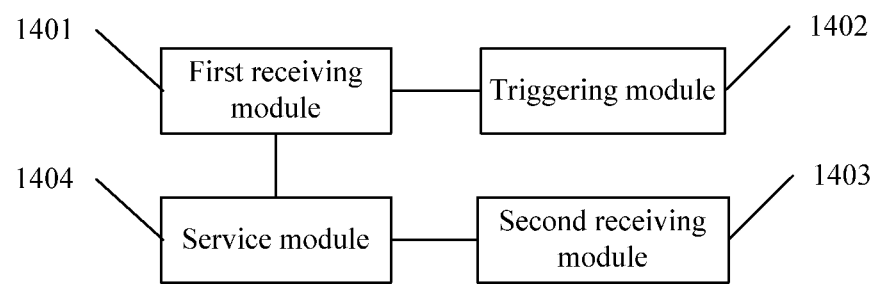
FIG. 14 is a schematic structural diagram of a back-to-back application server according to an embodiment of the present invention.

As shown in FIG. 14, an embodiment of the present invention provides a back-to-back application server, including:

a first receiving module 1401, configured to receive a first session request message sent by a calling user equipment, where the first session request message carries information indicating that a service is a priority service;

a triggering module 1402, configured to trigger, according to the information which indicates that the service is the priority service and which is received by the first receiving module 1401, a target user equipment to send an access request to an IP connectivity access network, so that the IP connectivity access network creates a priority service bearer corresponding to the priority service and registers the target user equipment with an IP multimedia subsystem by using the priority service bearer;

a second receiving module 1403, configured to receive a second session request message that is corresponding to the priority service and is sent by the target user equipment; and a service module 1403, configured to create a correlation relationship between a session indicated by the second session request message received by the second receiving module 1403 and a session indicated by the first session request message received by the first receiving module 1401, and carry out the priority service by using the priority service bearer.

For the detailed implementation method of the user equipment provided in this embodiment of the present invention, reference may be made to the method for processing priority services provided in the embodiments of the present invention shown in FIG. 12 and FIG. 13.

With the back-to-back application server provided in this embodiment of the present invention, according to the information which indicates that the service is a priority service and which is carried in the first session request message sent by the calling user equipment, the target user equipment is triggered to initiate an access procedure to a network, a priority service bearer is created, and the user equipment is registered with the IP multimedia subsystem; the second session request message is received from the target user equipment, the correlation relationship between the session indicated by the second session request message and the session indicated by the first session request message is set up, and the priority service is carried out by using the priority service bearer, thereby overcoming a problem in the prior art that priority services initiated from the network to the target user cannot be provided.

The method, the apparatus, and the system for processing priority services according to the embodiments of the present invention are applicable in an IMS-based communication system.

The steps of the method or algorithm described in the embodiments disclosed in the application may be implemented directly by using hardware directly or by using a software module executed by a processor, or by using both of them. The software module can reside in a random access memory (RAM), memory, read-only memory (ROM), electrically programmable ROM, electrically erasable programmable ROM, register, hard disk, removable disk, CD-ROM, or any other form of storage medium known in the art.

The above descriptions are merely about exemplary embodiments of the present invention, but not intended to limit the protection scope of the present invention. Any modifications, variations or replacements that can be easily derived by those skilled in the art within the technical scope disclosed by the present invention shall fall within the protection scope of the present invention. Therefore, the protection scope of the present invention is subject to the appended claims.

What is claimed is:

1. A method for processing a service, the method comprising:

receiving, by a mobility management entity (MME), a signaling that comprises information indicating a priority of a service to be carried out with a user equipment (UE), wherein an existing bearer that is used for the service is updated before the MME receives the signaling, wherein the priority of the service is determined by a proxy-call session control function (P-CSCF), and wherein the priority of the service is indicated to a policy and charging rules function (PCRF) by the P-CSCF so as to trigger the update of the existing bearer; and sending, by the MME, a first paging message to a base station attached by the UE, wherein the first paging message comprises an indication of the priority of the service so as to trigger the base station perform a paging procedure with priority.

2. The method according to claim 1, wherein the signaling is used to trigger the MME to page the UE.

3. The method according to claim 1, wherein the UE is in an idle state.

4. The method according to claim 1, wherein the paging procedure with priority comprises paging the UE according to the indication.

5. The method according to claim 4, wherein paging the UE according to the indication comprises sending a second paging message to the UE, wherein the second paging message comprises the indication of the priority of the service.

6. The method according to claim 1, wherein the base station is in a congestion situation.

7. The method according to claim 1, wherein the P-CSCF determines the priority of the service based on a received priority indication of the service.

8. An apparatus for processing a service, the apparatus comprising:

a first unit, configured to receive a signaling, wherein the signaling comprises information indicating a priority of a service to be carried out with a user equipment (UE); and a second unit, configured to send a first paging message to a base station attached by the UE, wherein the first paging message comprises an indication of the priority of the service so as to trigger the base station perform a paging procedure with priority, wherein an existing bearer that is used for the service is updated before the first unit receives the signaling, wherein the priority of the service is determined by a proxy-call session control function (P-CSCF), and wherein the priority of the service is indicated to a policy and charging rules function (PCRF) by the P-CSCF so as to trigger the update of the existing bearer.

9. The apparatus according to claim 8, wherein the signaling is used to trigger the apparatus to page the UE.

10. The apparatus according to claim 8, wherein the UE is in an idle state and the base station is in a congestion situation.

11. The apparatus according to claim 8, wherein the apparatus is a mobility management entity (MME).

12. A system for processing a service, the system comprising:

a mobility management entity (MME) that is configured to receive a signaling, wherein the signaling comprises information indicating a priority of a service to be carried out with a user equipment (UE), the MME further configured to send a first paging message to a base station attached by the UE, wherein the first paging message comprises an indication of the priority of the service so as to trigger the base station perform a paging procedure with priority; and wherein an existing bearer that is used for the service is updated before the MME receives the signaling; and a proxy-call session control function (P-CSCF), wherein the P-CSCF is configured to determine the priority of the service and to indicate the priority of the service to a Policy and Charging Rules Function (PCRF) so as to trigger to update the existing bearer, wherein the P-CSCF is configured to determine the priority of the service based on a received priority indication of the service.

13. The system according to claim 12, wherein the signaling is used to trigger the MME to page the UE.

14. The system according to claim 12, wherein the system further comprises the UE, wherein the UE is in an idle state.

15. The system according to claim 12, wherein the system further comprises the base station, wherein the base station is configured to perform the paging procedure with priority, wherein the paging procedure with priority comprises paging the UE according to the indication.

16. The system according to claim 15, wherein the base station is configured to send a second paging message to the UE, wherein the second paging message comprises the indication of the priority of the service.

17. The system according to claim 15, wherein the base station is in a congestion situation.

18. The system according to claim 12, wherein the P-CSCF is configured to determine the priority of the service based on a received priority indication of the service.

* * * * *